United States Patent [19]
Thuma

[11] Patent Number: 6,027,242
[45] Date of Patent: *Feb. 22, 2000

[54] FOOD PREPARATION BLENDER WITH MIXING BLADES OSCILLATING BETWEEN LARGER AND SMALLER VOLUMES

[75] Inventor: Michael C. Thuma, Des Plaines, Ill.

[73] Assignee: 24th & Dean, Chicago, Ill.

[*] Notice: This patent is subject to a terminal disclaimer.

[21] Appl. No.: 08/888,846

[22] Filed: Jul. 7, 1997

Related U.S. Application Data

[63] Continuation-in-part of application No. 08/641,883, May 2, 1996, Pat. No. 5,645,346
[60] Provisional application No. 60/003,156, Sep. 1, 1995.

[51] Int. Cl.[7] .................................... A47J 43/08
[52] U.S. Cl. .................. 366/205; 366/289; 366/314; 241/282.1
[58] Field of Search ................... 366/205, 289, 366/314; 241/199.11, 199.12, 201, 282.1, 282.2, 283, 292.1

[56] References Cited

U.S. PATENT DOCUMENTS

| 1,181,973 | 5/1916 | Tyson . | |
|---|---|---|---|
| 2,122,287 | 6/1938 | Kepper . | |
| 2,701,131 | 2/1955 | Love . | |
| 3,493,215 | 2/1970 | Edwards et al. | 366/205 |
| 3,738,583 | 6/1973 | Berland et al. | 366/205 |

*Primary Examiner*—Charles E. Cooley
*Attorney, Agent, or Firm*—Kramer Levin Naftalis & Frankel LLP

[57] ABSTRACT

A mixing apparatus that employs mixing blades that are capable of producing rotational mixing action and a vertically oscillating mixing action so that the blades are moveable within the apparatus from an area of a relatively larger volume to an area of a relatively smaller volume.

3 Claims, 4 Drawing Sheets

6,027,242

FOOD PREPARATION BLENDER WITH MIXING BLADES OSCILLATING BETWEEN LARGER AND SMALLER VOLUMES

This application is a continuation-in-part of Ser. No. 08/641,883, filed May 2, 1996, now U.S. Pat. No. 5,645,346, issued Jul. 8, 1997, which claims the benefit of U.S. Provisional application Ser. No. 60/003,156, filed Sep. 1, 1995.

BACKGROUND OF THE INVENTION

The present invention relates generally to a food preparation apparatus and method for using the same, and more particularly, to a blender that employs mixing blades that are capable of producing rotational mixing action and a vertically oscillating mixing action. An electric motor acts as the drive source and vertical oscillation is produced by a waveform ramp that raises and lowers the mixing blades.

SUMMARY OF THE INVENTION

The purpose of this invention is to provide a food preparation apparatus and method of use that increases the mixing efficiency over that typically associated with the blenders currently available in the marketplace. Not only does the invention impart rotational movement to the mixing blades, as with conventional devices, the invention also uses a waveform ramp to vertically oscillate the mixing blades as well.

Accordingly, an object of the present invention is to provide a food preparation apparatus which is more efficient than those currently available.

Another object of the present invention is to provide a food preparation apparatus which has a vertically oscillating mixing action.

Another object of the present invention is to provide a food preparation apparatus which uses a waveform ramp to provide vertical oscillation.

BRIEF DESCRIPTION OF THE DRAWINGS

These and other features, objects and advantages of the present invention will become apparent from the following description and drawings wherein like reference numerals represent like elements in the several views, and in which.

DETAILED DESCRIPTION OF THE PREFERRED EMBODIMENTS

Figure 1:
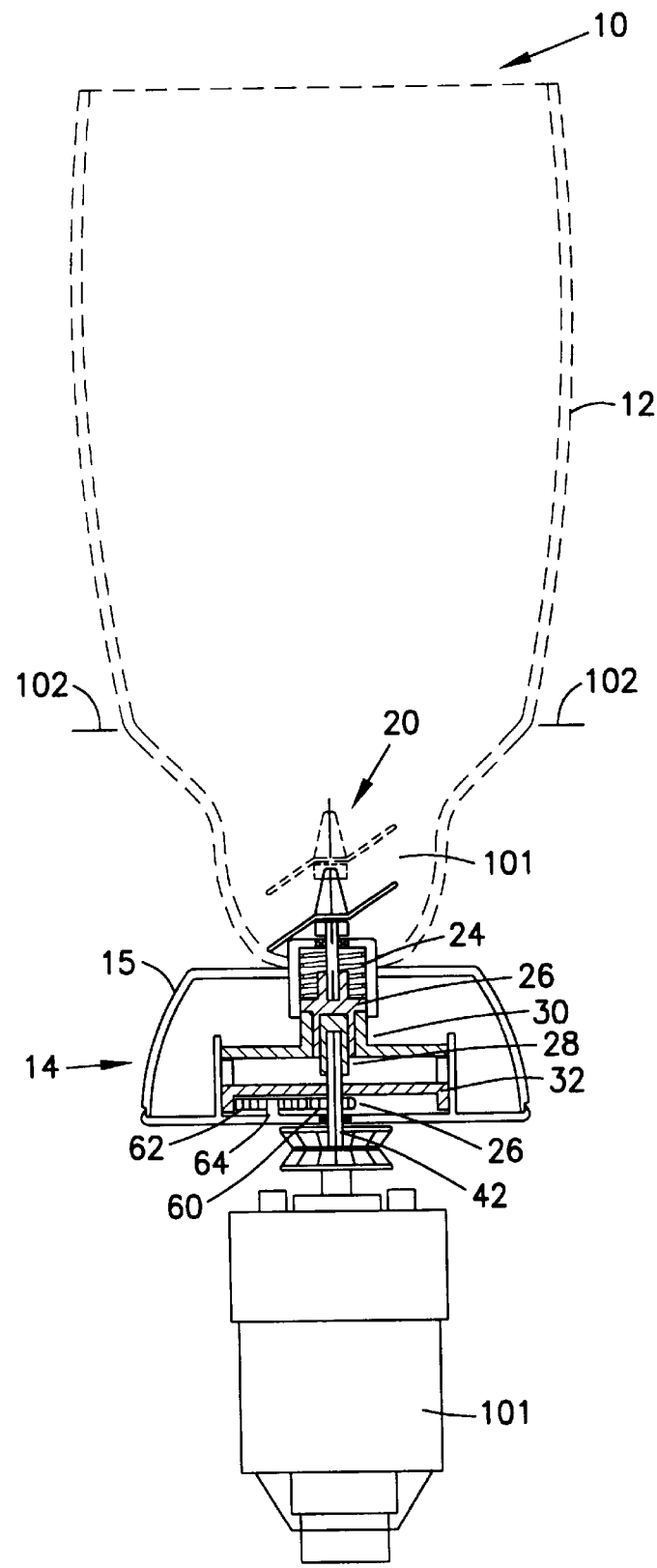
FIG. 1 is a cross-sectional view of one embodiment of the present invention.
Figure 2:
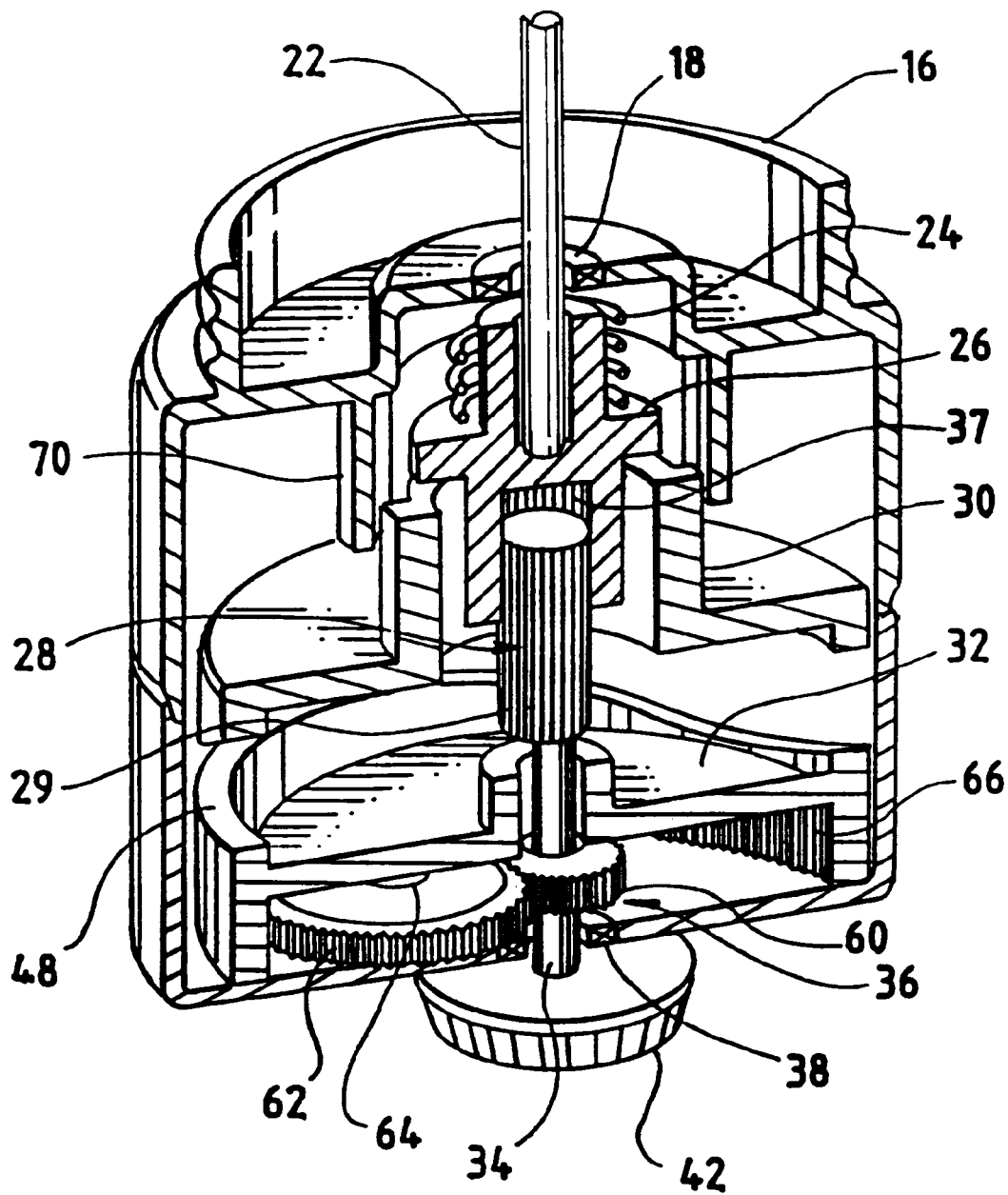
FIG. 2 is a perspective view of the transmission of the embodiment shown in FIG. 1 with portions removed to reveal aspects of the invention.

In accordance with a preferred embodiment of the present invention, the food preparation apparatus, such as that shown in FIGS. 1 and 2, includes a blender 10 having a container or pitcher 12, attachable transmission 14 having an outer housing 15, and an electric motor 100. Pitcher 12 is coupled to transmission housing 15 by attachment ring 16 formed on housing 15 which further includes a shaft seal 18 and may further use other seals to form a liquid barrier when pitcher 12 is attached. When assembled, mixing blade 20, which is attached to first shaft 22, is located within the mixing chamber of pitcher 12.

Contained within housing 15 are the components of transmission 14 which include a pressure plate spring 24, pressure plate 26, splined shaft connection 28, tracking guide 30, waveform ramp 32, second shaft 34, and speed reduction gears 36. A second shaft seal 38 again provides a barrier which separates the inner comments from the outside environment and further provides a bearing surface for the rotation of second shaft when coupled to electric motor 100 via motor attachment ring 42.

Figure 3:
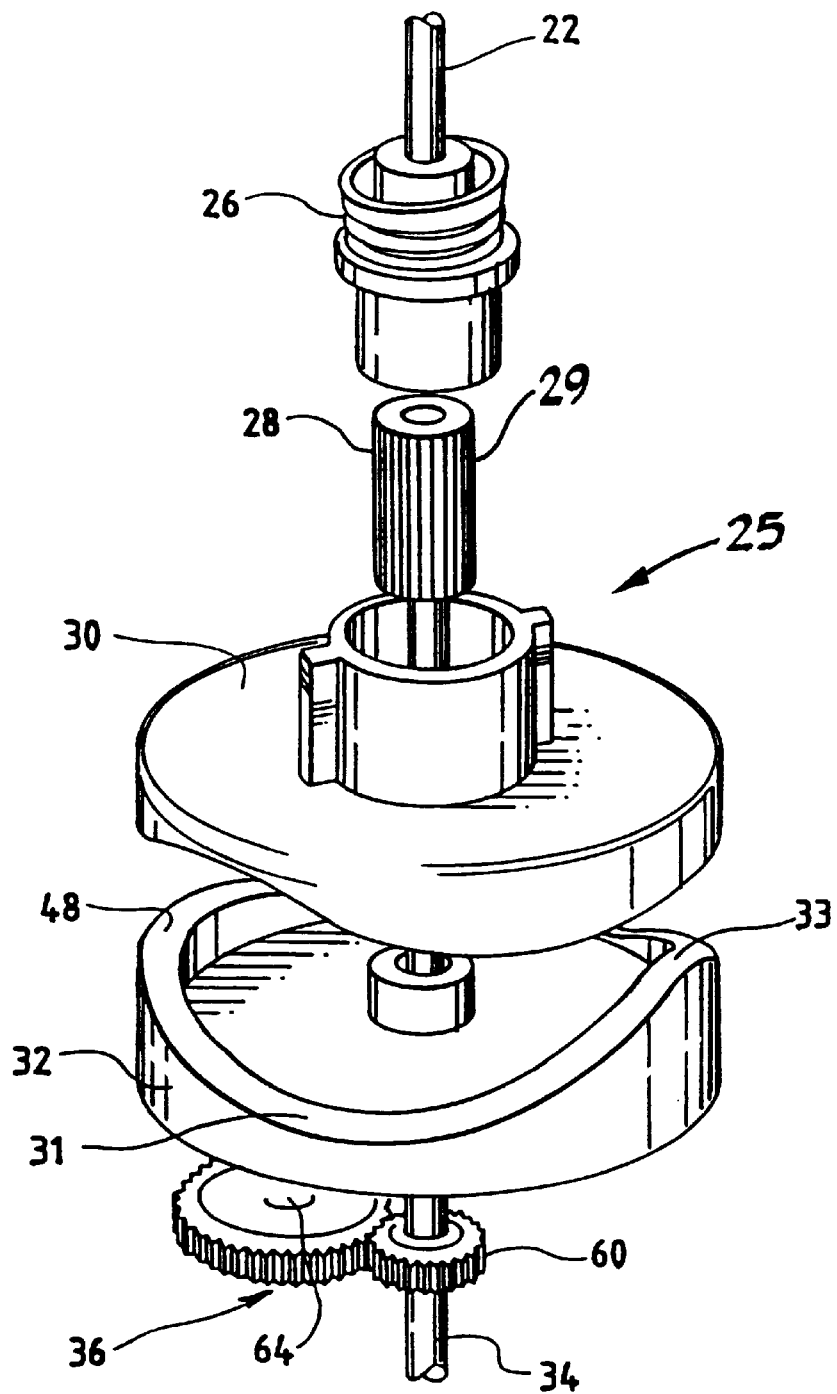
FIG. 3 is an exploded view of the transmission of the embodiment shown in FIG. 1.

As shown in FIGS. 2 and 3, transmission 14 is comprised of rotational drive system 25 that produces the rotational movement of blades 20 which are directly linked to the speed of electric motor 100. To do this, mixing blades 20 (see FIG. 1) are directly connected to the motor 100 by a series of intermediate connections. First, electric motor 100 is linked to attachment ring 42 which is integrally connected to second shaft 34, which is, in turn, connected to splined shaft connector 28. The drive system is then completed by connecting pressure plate 26 to connector 28 and to first shaft 22 which is used to drive mixing blades 20.

To oscillate mixing blades 20 in a path parallel to drive system 25, a waveform ramp 32 having a tracking surface 48 which engages tracking guide 30 is used. Included on ramp 32 are a series of depressions 31 and elevations 33 which impart vertical movement. As ramp 32 rotates within transmission 14, guide 30 tracks along surface 48, and consequently, it is raised and lowered along a vertical axis as ramp 32 rotates. This vertical motion is then transferred to mixing blades 20 by having guide 30 then push on pressure plate 26. As pressure plate 26 is lifted, it raises first shaft 22 which raises mixing blades 20.

So long as guide 30 maintains contact with tracking surface 48, it may be configured in a number of ways. As shown, a waveform configuration is used. However, two posts or rollers, or other configurations which would be known to those of ordinary skill in the art may also be used.

As the pressure plate 26 rises, it compresses tension spring 24 which is located between pressure plate 26 and housing 15. Compressing spring 24 will assist in the downward movement of the pressure plate and blades when guide 30 begins its descent down a depression 31 on tracking surface 48. The compressive force of spring 24 also serves to maintain the contact between guide 30 and tracking surface 48 during all phases of movement between these two components.

Ramp 32 is driven by speed reduction gears 36 which are directly linked to electric motor 100 but at a reduced operational speed. First gear 60 is connected to second shaft 34 and engages second gear 62 (see FIG. 2) which rotates around bearing shaft 64 located on housing 15. Gear 62, in turn, drives ramp 32 by engaging an inner gear ring 66 located on ramp 32.

It is important that the mixing blades maintain the ability to vertically oscillate while continuing to rotate. This may be accomplished by the use of splined shaft connector 28 and pressure plate 26. As shown in FIGS. 2 and 3, connector 28 has a fluted outer surface 29 that is adapted to slidably fit and mate within a correspondingly fluted internal bore 37 of pressure plate 26. Thus configured, the mating fluted surfaces prevent rotational slippage but at the same time allow for vertical slidability. Thus, rotational force may be continuously applied during vertical oscillation.

Since it is also unnecessary for guide 30 to rotate, as shown in FIG. 2, a retaining extension 70 extends from housing 15 to secure guide 30. Guide 30 and extension 70 should be connected by configuring the components to employ a tongue and groove or some other slotted arrangement which would allow vertical slidability while preventing rotational movement. Of course, these members may be secured in other ways which those of ordinary skill in the art would appreciate. Moreover, by having the housing act as a stop that prevents the rotation of guide 30, it still allows for the rotation of pressure plate 26 as was described above.

Figure 4:
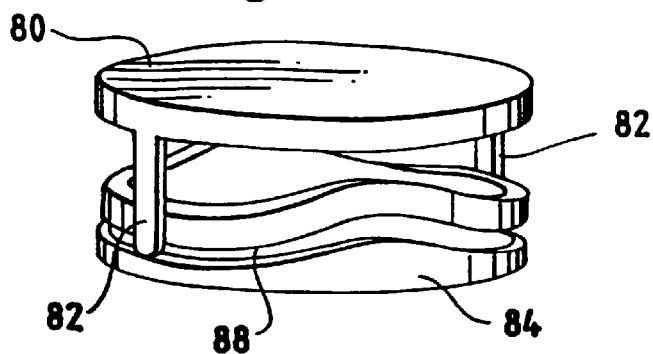
FIG. 4 is an exploded view showing an alternate waveform ramp that may be used with the invention.
Figure 5:
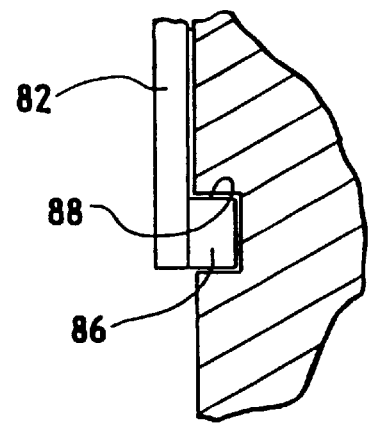
FIG. 5 is an exploded partial cross-sectional view of the embodiment shown in FIG. 4.

FIGS. 4 and 5 show another embodiment of the invention which does not require the use of a spring. In this embodiment, which is configured in a manner similar to that which was described above, guide 80 includes two downwardly extending posts 82 which are connected to waveform ramp 84 by the use of inwardly extending portions 86 which extend into groove 88 of waveform ramp 84. In operation, extensions 86 travel in groove 84 during the rotation of ramp 84. This causes guide 80 to be either pulled down or raised up thereby vertically oscillating the mixing blade.

Figure 6:
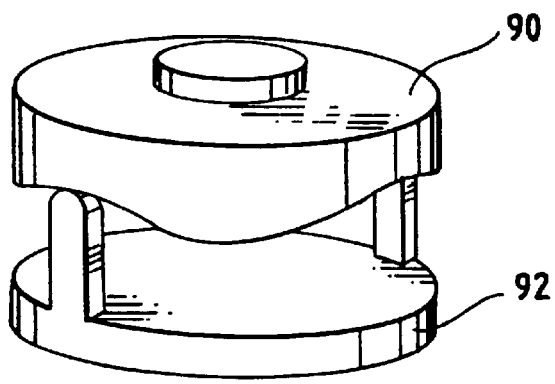
FIG. 6 is an exploded perspective view of another waveform ramp that may be used with the invention.

FIG. 6 shows an alternate embodiment of the invention in which the guide is the rotational element and the waveform ramp remains stationary. In this embodiment, waveform ramp 90 replaces the use of the guide and is incorporated into the device as was indicated above with respect to guide 30. In this embodiment, it is guide 92 that is connected to the drive means and rotates. The vertical oscillation is then provided through the use of the waveform configuration on guide 90. These two elements may be interconnected as was described above in either the embodiment employing the use of a spring or the embodiment employing a tongue and groove type arrangement as was shown in FIGS. 4 and 5.

It has also found that positioning blades 20 upwardly into pitcher 12 improves the mixing capability of the device. Positioned in this manner the downward movement of blades 20 directs material downwardly into a portion of pitcher 12 that defines a reduced volume. As shown in FIG. 1, this area is generally designated as portion 101.

By directing the material into an area of reducing volume as blades 20 descend, the material is both compressed and further contacted by blades 20. Compressing the material is beneficial since it prevents material from being conveyed away from the path of blades 20 by the currents generated inside pitcher 12. As blades 20 travel in an upwardly direction, they push material previously processed up into the pitcher, and the above described process is again repeated when blades 20 reverse direction.

Moreover, as shown in FIG. 1, optimal results may be obtained by having blades 20 positioned in the interior of pitcher 12 at a point above line 102. At this location blades 20 are positioned above the throat of the pitcher at a point where pitcher 12 begins to be reduced in volume. It is also desirable to size the area of the throat of pitcher 12 where blades 20 descend to their most downward position to be slightly larger than the diameter of blades 20.

It has been found that coordinating the movement of blades 20 with the size of pitcher 12 in this manner produces a satisfactory mixing action that is superior to that of conventional mixing apparati.

While the preferred embodiments of the present invention have been illustrated and described, it will be understood by those of ordinary skill in the art that changes and other modifications can be made without departing from the invention in its broader aspects. It is therefore intended that such changes and modifications be covered by the following claims.

What is claimed is:

1. A blender for preparing food comprising:

a container, a transmission, and an electric motor, said container attachable to said transmission and having a throat portion defining an area of decreasing volume relative to an upper portion of the container;

said transmission further including a housing with a drive shaft disposed therein that is operatively connected to said electric motor;

a mixing blade positioned upwardly into the container and attachable to said drive shaft, said mixing blade rotated by the operation of said electric motor;

a speed reducer contained within said housing of said transmission, said speed reducer operatively driven by said electric motor;

a waveform ramp configured to have at least one elevation and at least one depression, said waveform ramp operatively rotated by said speed reducer at a slower rotational rate than said mixing blade; and a guide that operatively engages said mixing blade and said elevation and depression of said waveform ramp, said engagement of said guide oscillates said mixing blades on a vertical axis between locations in said container having larger and smaller volumes.

2. The device of claim 1 wherein said guide is operatively rotated by said speed reducer and said waveform ramp engages said guide and said mixing blade to oscillate said mixing blade on a vertical axis.

3. The device of claim 1 wherein said speed reducer is comprised of gears.

* * * * *